United States Patent [19]

Petty et al.

[11] 4,056,212

[45] Nov. 1, 1977

[54] PORTABLE PRESSURE VESSEL AND CLOSURE

[75] Inventors: Jon Petty, Newton, N.J.; Beverly D. Trott; Joseph E. Backofen, both of Columbus, Ohio

[73] Assignee: The United States of America as represented by the Secretary of the Army, Washington, D.C.

[21] Appl. No.: 776,692

[22] Filed: Mar. 11, 1977

[51] Int. Cl.² ............................................. B65D 45/00
[52] U.S. Cl. ..................................... 220/244; 220/334
[58] Field of Search ................. 220/243, 244, 334, 335

[56] References Cited

U.S. PATENT DOCUMENTS

| 1,924,279 | 8/1933 | Harter | 220/244 |
|---|---|---|---|
| 2,959,320 | 11/1960 | Feagan et al. | 220/244 |

Primary Examiner—George T. Hall
Attorney, Agent, or Firm—Nathan Edelberg; A. Victor Erkkila; Max Yarmovsky

[57] ABSTRACT

A portable spherically shaped pressure vessel utilizes a noninterfering single pivot internally operable door slidably supported against an interior wall surface for safely storing and transporting an improvised explosive device therein. The door in its open position provides rapid unobstructed access through a conveniently positioned reinforced port hole and rapid closure of the port with complete sealing of the explosive contents contained within the vessel.

3 Claims, 7 Drawing Figures

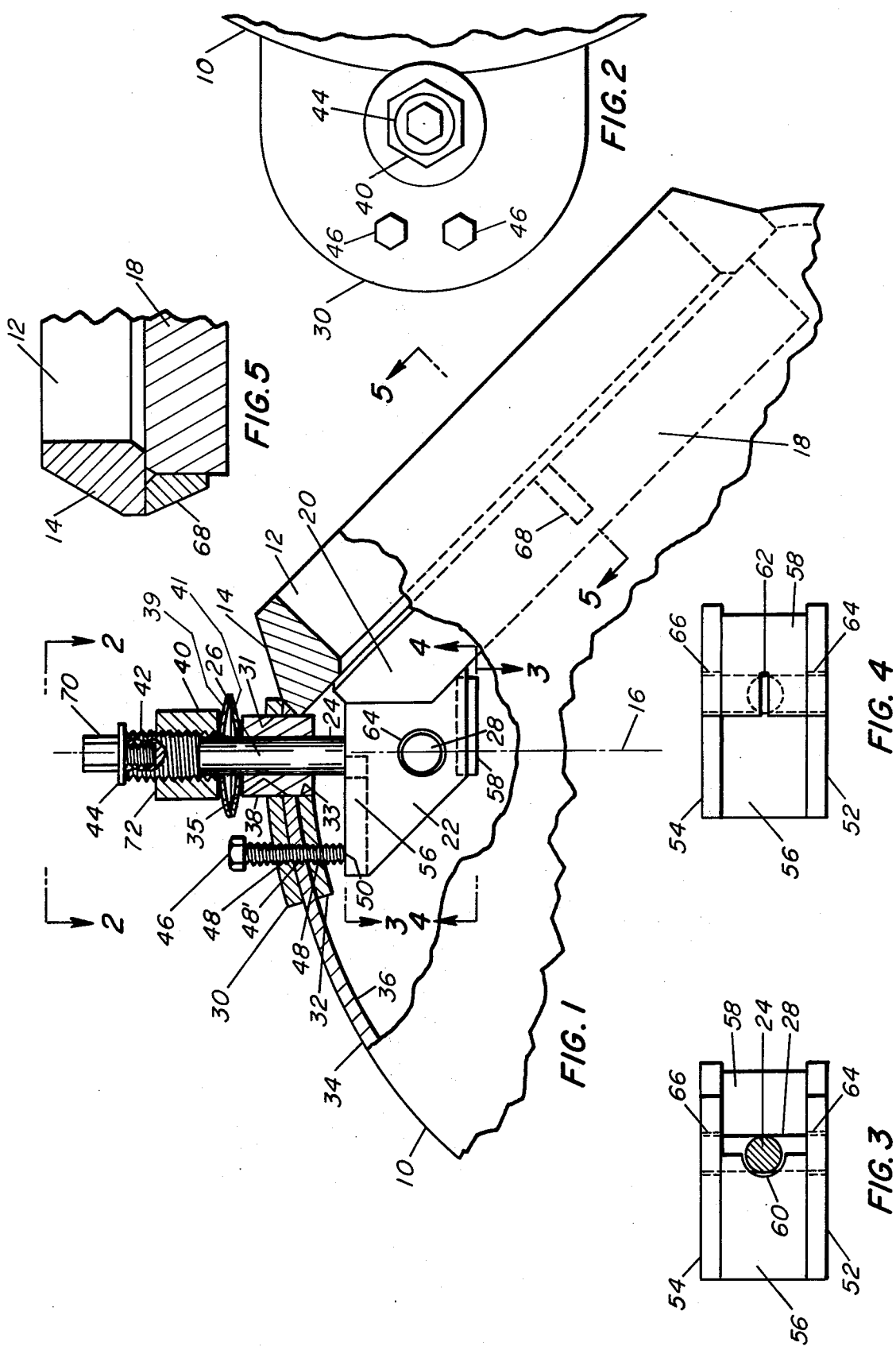

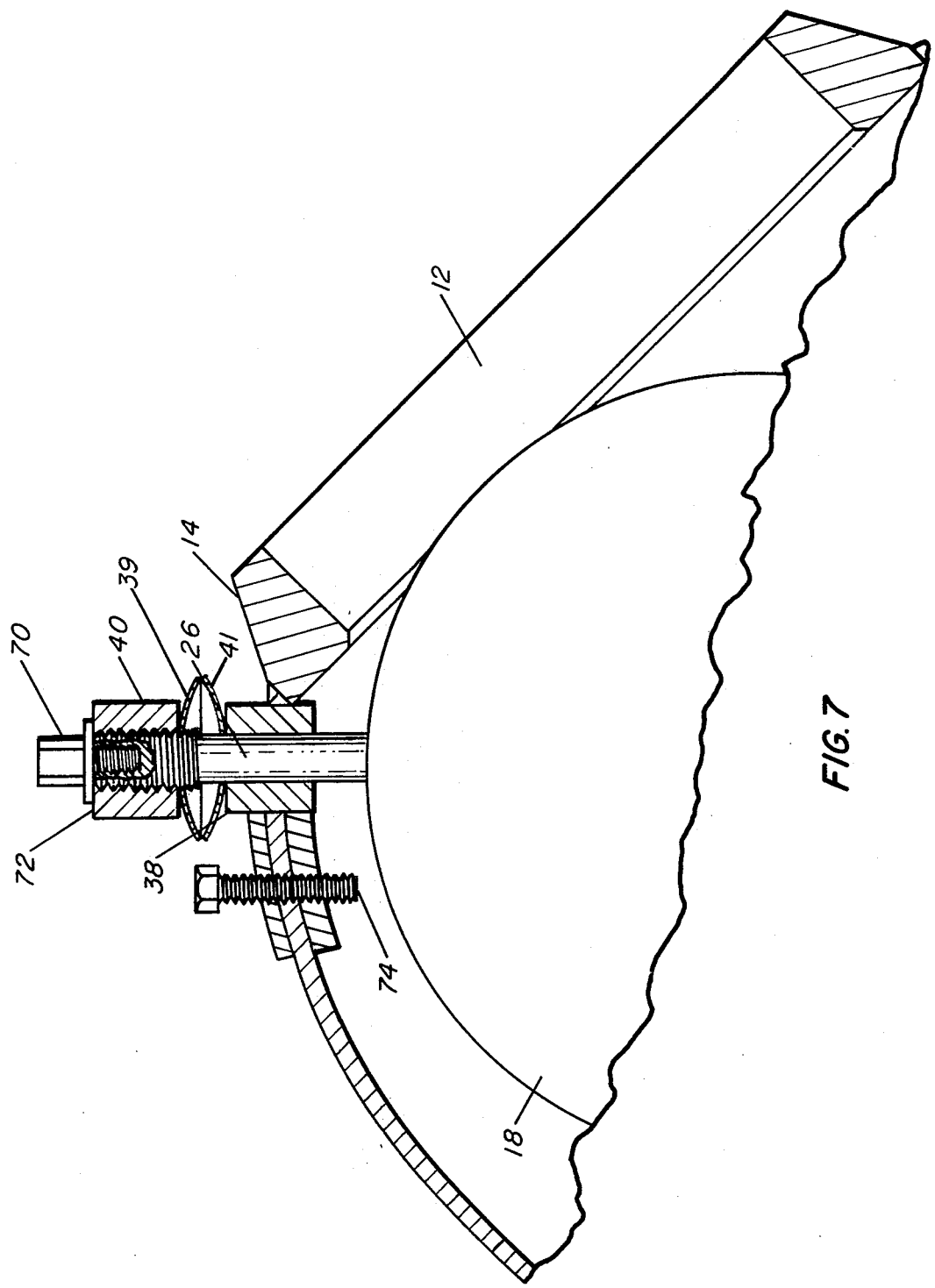

4,056,212

PORTABLE PRESSURE VESSEL AND CLOSURE

GOVERNMENTAL INTEREST

The invention described herein was made in the course of a contract with the Government and may be manufactured, used and licensed by or for the Government for governmental purposes without the payment to us of any royalty thereon.

BACKGROUND OF THE INVENTION

Various means have been used in the prior art to provide a safe pressure vessel for quick, safe storage for improvised explosive devices. Some prior art devices use a bolted closure, such as a flat plate, to seal an access port of the vessel. The difficulty with the use of this device was the inordinate length of time necessary to effect a closure and the lack of adequate strength to contain the detonation products therein. Other prior art devices use an internally hinged flat plate door, which is larger than the vessel's access port, to effect a closure. This type of closure is operated by swinging the door into the vessel's interior. Other prior art devices use cafe style doors which are similar to the internally hinged door with the exception that the door is cut vertically in half and hinged on both sides of the port inside the pressure vessel. A further type of door used on prior art devices had pressure cooker type closures. The pressure type closure generally uses an interrupted ring lock with an inclined plane for locking. This latter type of closure is frequently operated by inserting the door into a breach on the vessel and rotating the cover a few degrees to lock the lugs on the cover against the lugs on the vessel. The problem with the aforementioned prior art devices included interference with the internal configuration of the vessel or the contents contained therein, lack of complete sealing of the detonation products, difficulty or length of time required to operate the closure, and lack of adequate strength to contain the products of the explosive device.

SUMMARY OF THE INVENTION

The present invention relates to a pressure vessel which provides for the safe storage and quick transportation of an improvised explosive device away from populated areas. The present invention utilizes a spherically shaped container having a reinforced circularly shaped port which can rapidly be closed by a noninterferring internally positioned single pivoted sliding door member.

An object of the present invention is to provide a portable pressure vessel having a circularly shaped port which permits rapid access into the vessel for the placement of an improvised explosive device therein and permits rapid closure for the port without interference with the explosive device contained in the vessel.

Another object of the present invention is to provide a portable pressure vessel having a closure whose strength is equal to or greater than that of the vessel itself.

Another object of the present invention is to provide a single pin pivot closure for a pressure vessel which will withstand the same internal pressure as the vessel and in addition can be fully opened and closed quickly.

A further object of the present invention is to provide a portable pressure vessel having an internal closure which offers minimum interference with the internal configuration of the vessel or the contents of the vessel stored therein.

For a better understanding of the present invention, together with other and further objects thereof, reference is made to the following descriptions taken in connection with the accompanying drawings.

BRIEF DESCRIPTION OF THE DRAWINGS

FIG. 1 is a partial cross-sectional cutaway view of the pressure vessel and closure.

FIG. 2 is a top view taken along line 2—2 of FIG. 1.

FIG. 3 is a partial cross-sectional view of a single pin support member taken along line 3—3 of FIG. 1.

FIG. 4 is a bottom view of the support member taken along line 4—4 of FIG. 1.

FIG. 5 is a cross-sectional view taken along line 5—5 of FIG. 1.

FIG. 7 is similar to the view shown in FIG. 6 with the exception of the door being rotated 90° so that the access port fully opened.

Throughout the following description like reference numerals are used to denote like parts of the drawings.

DESCRIPTION OF THE PREFERRED EMBODIMENTS

Figure 6:
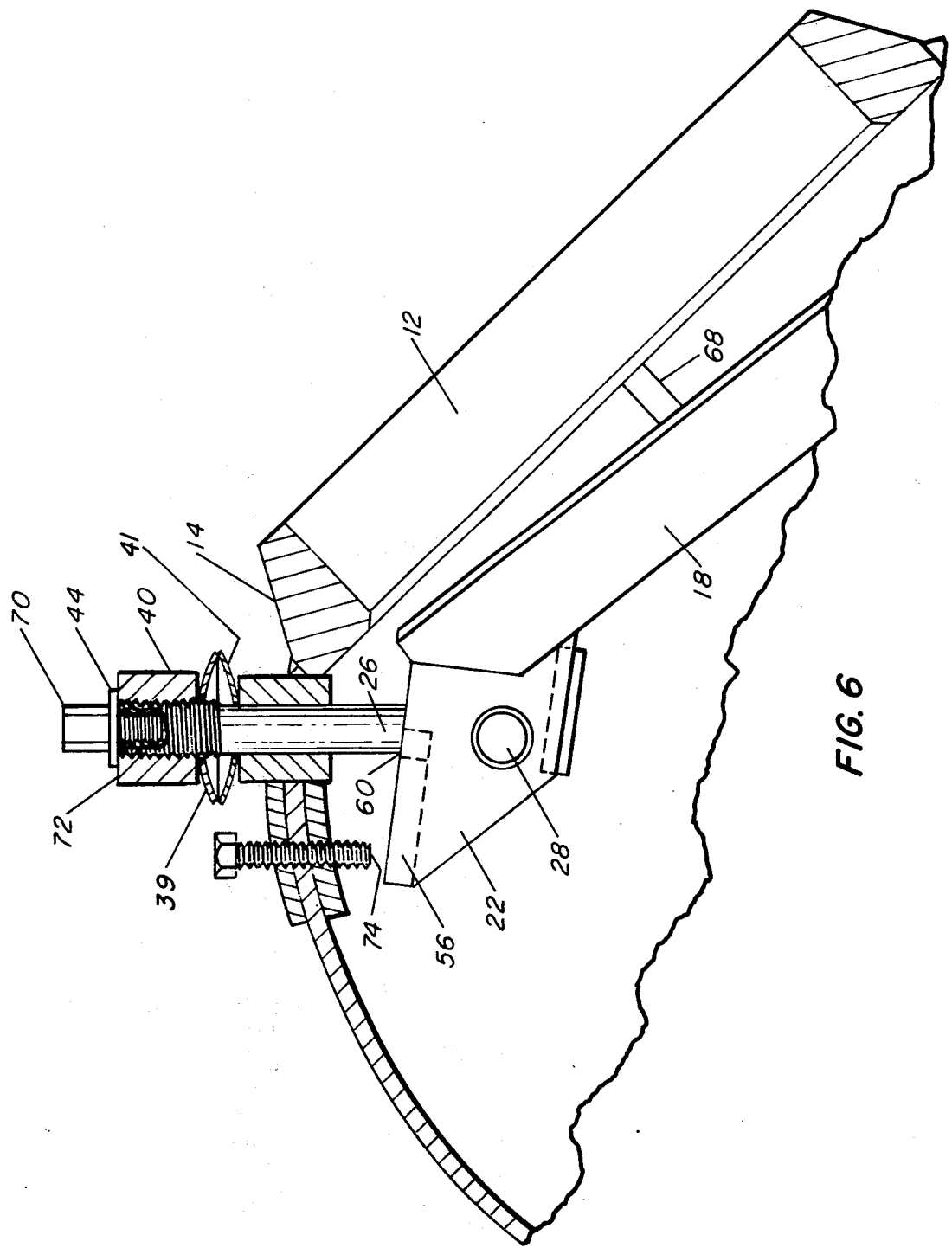
FIG. 6 is a partial cutaway cross-sectional view of the pressure vessel and closure after the door has been opened by lowering a support member.

Referring now to FIGS. 1, 2 and 3 a spherically shaped body member 10 has a circularly shaped access port 12 disposed in an upper hemispherical side of the body member 10. An annular reinforcing port ring member 14 is circumferentially welded to the body member 10, adjacent to the peripheral edge of access port 12, at an angle of approximately 45° with respect to the vertical axis 16. A circularly shaped disc door member 18 is welded on one end 20 to the ends of a pair of side plates of a pivotal door support member 22, the side plates to be further described hereinafter. Door support member 22 is hingedly attached to a "T" bar member 24. "T" bar member 24 has a partially threaded vertically held bolt element 26 integrally attached to a horizontally disposed pivot element 28. A pair of reinforcing plates 30 and 32 are welded to the vessel's exterior and interior surfaces 34 and 36 respectively. A tubular bushing 38 is located in concentric disposed plate bushing bores 31 and 33 and body bushing bore and fixedly welded to the plates 30 and 32 and the body so that its longitudinal axis is axially aligned with bolt element 26 and the vessel's vertical axis 16. Bellville type springs 39 and 41 are biasedly disposed intermediate bushing 38 and nut 40. Nut 40 is threadedly positioned on threaded bolt section 42 intermediate screw flange 44 and bushing 38. A pair of door closing adjusting bolts 46 threadedly passes through threaded plate bores 48 and vessel threaded bore 48' to abut against a top surface 50 of support member 22. Threaded bores 48 and 48' are axially in line and proximate to bushing 38.

Referring now to FIGS. 1, 3 and 4, the welded door support member 22 comprises a pair of symmetrically shaped side plates 52 and 54 which are held fixedly in parallel relation on the top by a rectangularly shaped top plate member 56 and on the bottom by rectangularly shaped bottom plate 58 each of the side plates 52 and 54 being welded to top and bottom plates 56 and 58 respectively. Top plate 56 has a semicircular groove 60 therein to allow for passage of "T" bar member 24 therethrough and to act as a support point for aiding in supporting door member 18 while opening. Bottom plate member 58 has a slot 62 therein for allowing an improvised explosive to be hung therefrom. Support member side plates 52 and 54 have transverse axially aligned pivot bores 64 and 66 respectively therein to allow for rotation of support member 22 and door 18 about "T" bar pivot element 28 when door 18 is being closed or opened.

Referring now to FIGS. 1 and 5 a door stop 68 is fixedly positioned to reinforcing ring 14 to stop door 18 when it reaches a position which fully closes access port 12.

In operation door 18 is moved from its fully closed position shown in FIG. 1 to a partially open position as shown in FIG. 6 by rotating nut 40 in a direction so that screw head flange 44 comes in contact with the top surface 72 of nut 40. As shown in FIG. 6 the door 18 will tilt away from reinforcing ring 14 as the support member 2 rotates about pivot element 28. The door tilt will continue until the top edge of the top plate semi-circular groove 60 hits the circumference of "T" bar bolt element 26. As shown in FIG. 7 additional rotation of the nut 40, in the same direction, will cause the "T" bar unthreaded bolt element 26 to rotate within bushing 38 and the "T" bar member 24, support member 22 and door 18 to rotate 90° so that door 18 is in a fully open position as shown in FIG. 7. To close access port 12 the screw head 70 and nut 40 are rotated in an opposite direction than aforementioned causing the "T" bar shaft to rotate in a direction to move door 18 so that its front edge comes in contact with door stop 68. Continued rotation of nut 40 will cause the previously set adjusting bolt bottom end 74 to contact support member top plate 56 causing the support member 22 to rotate about pivot element 28 and thus return door 18 to its closed position.

The foregoing disclosure and drawings are merely illustrative of the principles of this invention and are not to be interpreted in a limiting sense. We wish it to be understood that we do not desire to be limited to the exact details of construction shown and described for obvious modifications will occur to a person skilled in the art.

Having thus fully described the invention, what is claimed as new and desired to be secured by Letters Patent of the United States is:

1. A closure for a pressure vessel for safely storing and transporting an improvised explosive device therein which comprises:
    a spherically shaped body member having a vertical axis, a body bushing bore being disposed therethrough concentric with said vertical axis, an access port disposed in an upper hemispherical side of said body member, and two vessel threaded bores transversely passing therethrough and being proximate to said vertical axis;
    a reinforcing ring member circumferentially welded to the peripheral edge of said access port, said reinforcing ring member being inclined at approximately 45° with respect to said vertical axis of said body member;
    internal door means pivotally held in juxtaposition to said reinforcing ring member for providing rapid unobstructed access through said access port and for rapidly closing said access port of said body member to completely seal said improvised explosive device therein; and
    a door stop fixedly welded to said reinforcing lug for stopping said internal door means when it reaches a closed position;
    a pair of reinforcing plates fixedly welded to said body member, said pair of reinforcing plates having plate bushing bores therein axially aligned with said body bushing bore, plate threaded bores passing transversely therethrough and being concentrically aligned with said vessel threaded bores;
    a tubular bushing fixedly positioned in said plate and vessel bushing bores;
    a pair of door closing adjusting bolts threadedly positioned in said plate threaded bores and said vessel threaded bore, said pair of bolts having ends protruding into the interior of said body member;
    a single pivot "T" bar means pivotally positioned in said bushing and rotatably connected to said internal door means for rapidly opening and closing said internal door means.

2. A closure for a pressure vessel as recited in claim 1 wherein said internal door means comprises:
    a circularly shaped disc door member;
    a pivotal support member welded to one end of said door member which includes;
    a pair of side plates each having a transverse axially aligned pivot bore therethrough, one end of said side plates being fixedly welded to one end of said door support member;
    a rectangularly shaped top plate member welded intermediate said pair of side plates, said top plate member having a semi-circular groove transversely disposed through one end of said top plate member; and
    a rectangularly shaped bottom plate member welded intermediate said pair of side plates, said top and bottom plate members holding said side plates in their relative positions.

3. A closure for a pressure vessel as recited in claim 2 wherein said single pivot "T" bar means comprises:
    a "T" shaped bolt element having a threaded section end and an integral unthreaded bolt section, said unthreaded section slidably passing through said tubular bushing and being integrally connected with a horizontally positioned "T" bar pivot element, said "T" bar pivot element being rotatably disposed in each of said pivot bores of said pair of side plates;
    a screw having a screw head flange thereon threadedly disposed in said threaded section end of said "T" shaped bolt element;
    a nut threadedly positioned on said threaded section end of said "T" shaped bolt element, said nut being disposed adjacent to said screw head flange; and
    a pair of bellville type springs disposed on said "T" shaped bolt element intermediate said nut and said tubular bushing, said access port being closed by said disc door member when said nut is rotated in a first direction causing said "T" bar bolt element to move upwardly to the point where the bottom end of said adjusting bolts hit said top plate member causing said pivotal support member to rotate about said "T" bar pivot element, forcing said circularly shaped disc door member to abut against said reinforcing ring member, said access port being opened when said nut is rotated oppositely from said first direction causing said "T" bar bolt element to move downwardly and said top plate member to move away from the bottom end of said adjusting bolts and said disc door member to tilt away from said reinforcing ring member until the top edge of said top plate semicircular groove hits the circumference of said "T" bar bolt element, continuing rotation of said nut oppositely from said first direction causes said "T" bar bolt element and disc door member to rotate away from said access port when said screw head flange comes in contact with the top surface of said nut providing unobstructed access through said access port to the interior of said pressure vessel.

* * * * *